Sept. 26, 1944.  W. J. PRYOR ET AL  2,359,152
INJECTOR FLASK
Filed May 2, 1941  2 Sheets-Sheet 1
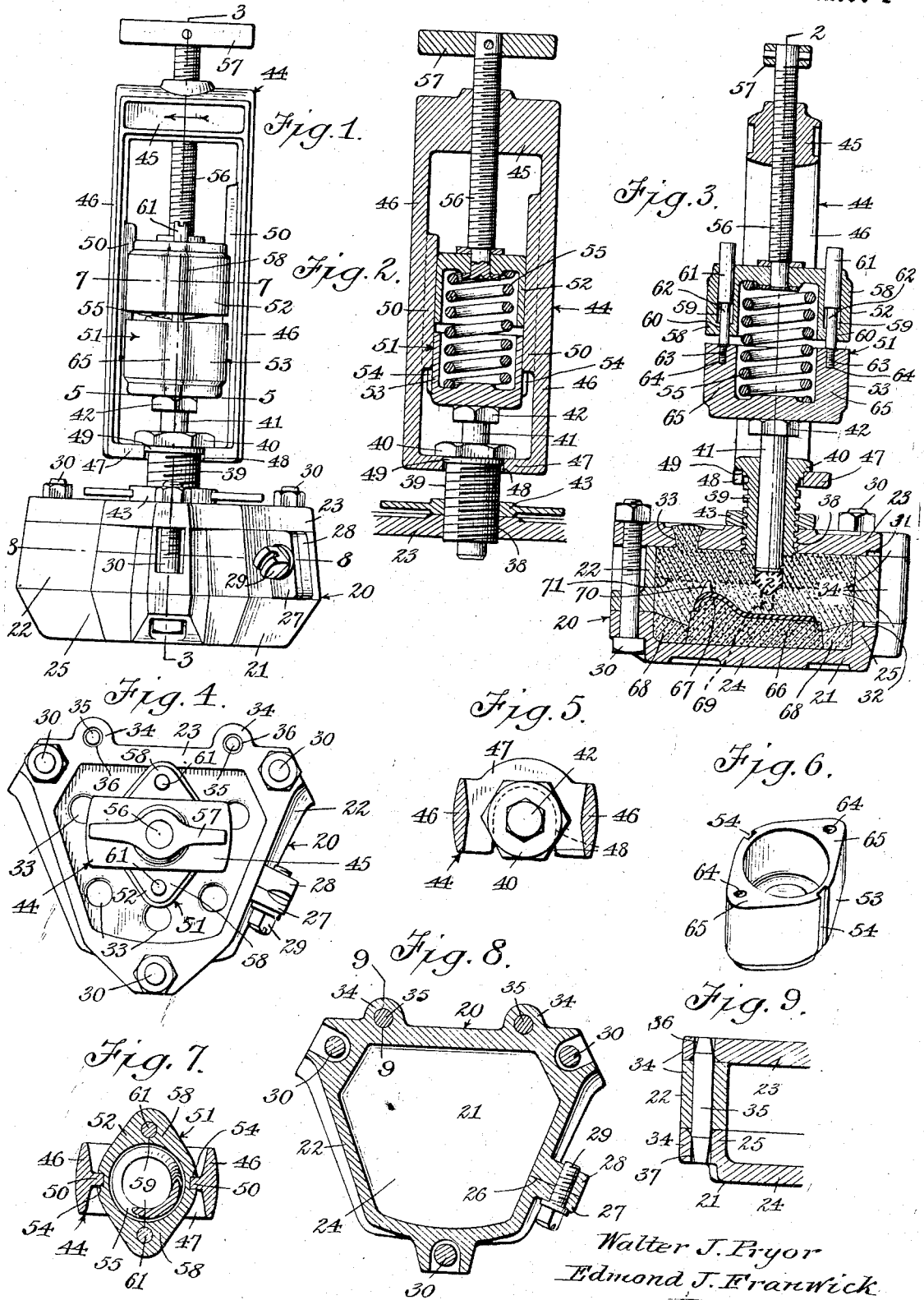
Walter J. Pryor
Edmond J. Franwick
Inventors,
By Emil Kuhach
Attorney.

Sept. 26, 1944.  W. J. PRYOR ET AL  2,359,152
INJECTOR FLASK
Filed May 2, 1941  2 Sheets-Sheet 2

Walter J. Pryor
Edmond J. Franwick } Inventors
By Emil Neuhart
Attorney.

Patented Sept. 26, 1944

2,359,152

UNITED STATES PATENT OFFICE 2,359,152

INJECTOR FLASK

Walter J. Pryor, Cleveland, Ohio, and Edmond J. Franwick, Buffalo, N. Y., assignors to Hanau Engineering Company, Inc., Buffalo, N. Y., a corporation of New York Application May 2, 1941, Serial No. 391,612

6 Claims. (Cl. 18—33)

Our invention relates to dental molding apparatus, such as employed in making artificial dentures from plastic material.

The plastic material usually employed for making dentures is subject to shrinkage during curing, and this necessarily results in the production of a denture which will be an imperfect fit in the mouth for which it has been designed. Moreover, if the plastic material, such as synthetic resins and rubber or other approved plastic substances, is not under constant pressure, a pulling strain would be caused to take place at the necks of the teeth which would result in the cracking of the teeth, and in some instances the cracking of the plate or body portion of the denture adjacent the teeth. Such strains or inherent stresses also have a tendency to cause lateral deflection of one or more of the teeth and thereby disturb the relation of the teeth to the denture base as originally intended and arranged in the wax.

As ordinarily practiced, excess denture material is inserted in the mold or flask, the latter being closed with hand pressure, after which the mold is placed in a press and the parts thereof forced together. This requires excessive pressure, causing thickened portions beyond that of the wax eliminated and disturbs the arrangement of the teeth for articulation as set up in wax, thereby creating fins at the edge or periphery of the denture and causing a dislocation of parts. The teeth are, therefore, no longer in the relation to the denture base or gums originally intended and as they were arranged in the wax.

It is one of the objects of our invention to provide an improved injector and injection mold or flask for making artificial dentures by means of which the above-mentioned objections are entirely obviated.

A further object of our invention is to provide a mold or flask by means of which a highly condensed material is provided for the denture without causing dislocation of the teeth, or distortion or malformation of any of the parts or surface areas of the denture.

Another object of our invention is to provide a denture mold or flask in which combined hand pressure is applied so as to exert force against the plastic material which, by reason of its nature, has a tendency to shrink, and utilizing constant strain or other automatic pressure to condense the material and augment the supply thereof to the cavity in which the denture is to be formed; the constant pressure thus provided and the augmented supply of plastic material furnished as required assuring a thoroughly condensed plastic composition incapable of shrinking or of causing fractures of the teeth.

A further object of our invention is to provide a combined injector and mold or flask which is easily manipulated, inexpensive, comparatively simple in construction, and readily adjustable to meet any requirements in the production of artificial dentures.

With the above and other objects to appear hereinafter, our invention consists in the novel features of construction and in the arrangement and combination of parts to be hereinafter described and more particularly pointed out in the subjoined claims.

In the drawings,

Fig. 1 is an elevation of our improved injector and injection mold or flask.

Fig. 2 is a vertical section taken on line 2—2, Fig. 3, the plunger-cylinder, however, being shown in elevation.

Fig. 3 is a vertical section taken on line 3—3, Fig. 1, looking in the direction of the arrow crossing said line.

Fig. 4 is a plan view of the device.

Fig. 5 is a horizontal section taken on line 5—5, Fig. 1.

Fig. 6 is a detached perspective view of one of the members forming the spring chamber.

Fig. 7 is a horizontal section taken on line 7—7, Fig. 1.

Fig. 8 is a horizontal section taken on line 8—8, Fig. 1.

Fig. 9 is a vertical section taken on line 9—9, Fig. 8.

Figure 10:
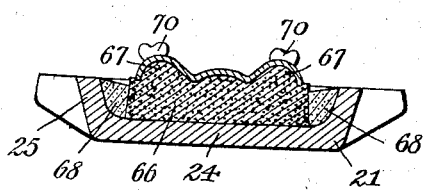
Fig. 10 is a vertical section of the lower member or section of the flask showing the preformed case invested therein and retained in position by means of plaster of Paris or other suitable investment material; the preformed case being so positioned that a line transversely through the axial plane of the device will be across the first molar region of the case.
Figure 11:
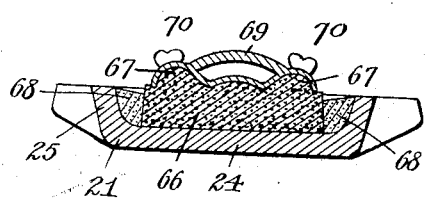
Fig. 11 is a similar view showing an arched wax-sprue applied to the case, opposite ends of this sprue being attached to that portion of the case directly below the first molar teeth.

Referring now to the drawings by reference numerals, 20 designates the mold or flask considered as a whole. This flask may be formed in any suitable manner so long as it retains the essential parts of the mold or flask illustrated and it permits the use of a cylinder and piston or plunger applied as shown. The mold or flask preferably comprises a lower section 21, a central or intermediate section 22, and a cover or top section 23. While we have shown the flask somewhat of triangular formation in the drawings, it may be otherwise formed if desired. The lower section is dish-like in formation and comprises a bottom 24 and an upstanding or peripheral wall 25, the upper edge of the latter being machined smooth and having the lower edge of the peripheral wall of the intermediate section 22 likewise finished, in firm contact therewith. This wall is split at 26; and at opposite sides of the line of separation thus formed, lugs 27, 28 are provided, through one of which a screw 29 is passed and into the other of which it is threaded. This screw may be termed an investment-releasing screw since when slightly unscrewed, the peripheral wall of the intermediate section becomes expanded or enlarged, for a purpose to appear hereinafter. The upper edge of the peripheral wall of this intermediate section is also machined smooth and even, and the cover or top section 23 rests upon said edge. Bolts 30 are employed to fasten the three sections of the mold together.

As is common in flasks of this type, pry-notches are provided in the wall of the flask for the purpose of facilitating the separation of the sections of the flask. These are, for example, shown at 31, 32, Fig. 3, the pry-notch 31 being formed on the under side of the cover or upper section and pry-notch 32 in the wall of the lower section at the upper edge thereof. The cover or upper section is also provided with the usual key-openings 33 for keying the investment and for the escape of any surplus investment material.

On one side of the flask two sets of vertically-alined lugs 34 are formed, and in the lugs of the central or intermediate section 22, dowel pins 35 are driven with opposite ends projecting therefrom and adapted to enter openings 36, 37 formed respectively in the lugs of the cover or upper section 23 and the lower section 21 of the flask, this being for the purpose of axially alining the sections so that when placed in superimposed relation, they will be accurately positioned for connecting them together by means of the bolts 30. A threaded opening 38 is formed in the cover or upper section, and into this is adjustably threaded an anchor in the form of a sleeve 39 which we utilize as and term a piston or plunger cylinder for the injector or pressure device employed. This sleeve or cylinder has a hexagonal or other non-circular flange 40 at its upper end by means of which a wrench may be applied thereto for adjusting the same when found necessary, and in this sleeve is slidably fitted a piston or plunger 41 having a head 42 at its upper end. A wing-like nut 43 is applied to the sleeve or cylinder 39 and is designed to be clamped against the upper face of the cover or top section of the mold or flap when the cylinder is properly adjusted.

The reference numeral 44 designates what we term an injector frame. It is cast or otherwise formed in the shape of an elongated loop having a header 45, side members 46 extending downwardly from said header, and a tailpiece or transverse bottom member 47 connecting the lower ends of said side members. The tail-piece 47 is provided with a notch 48 opening at one edge and designed to receive the upper end of the cylinder 39. The tail-piece may therefore be said to straddle the cylinder and the flange 40 at the upper end of the latter lies in contact with the upper side of said tail-piece. The cylinder has an externally-threaded region extending from its lower end to a point near the flange, at which point the exterior diameter of the cylinder is slightly enlarged, as at 49, to snugly fit into the notch 48 formed in the tail-piece of the injector frame, thereby assuring a non-wobbling connection between the cylinder and the injector frame. The side members 46 of the injector frame may be termed guide members, since they have guide ribs 50 formed along their inner sides. These guide ribs terminate in the same horizontal plane at their lower ends, but one of these is considerably shorter than the other so that their upper ends terminate in different horizontal planes.

Within this injector frame we provide a spring chamber 51 which comprises two hollow or cup-like members 52, 53, the open ends of which are in opposition, and these cup-like members are provided at diametrically-opposite points with guide grooves 54 which receive the guide ribs 50 on the injector frame. The closed lower end of the lower cup-like member 53 is adapted to bear against the head 42 of the piston or plunger 41, and between the two members and within the hollow portions thereof a helical spring 55 is fitted, the upper end of which bears against the upper wall of the upper member 52 and the lower end against the lower wall of the lower member 53. It will be apparent, therefore, that the upper cup-like member of this spring chamber is employed in inverted position so that the opposed cavities in the two cup-like members form a spring chamber in which the spring 55 is confined under pressure.

56 is a pressure screw which has its lower end rotatably mounted in the end wall of the inverted upper cup-like member 52, and it is threaded through the header 45 of the injector frame and has a handle 57 pinned or otherwise secured to its upper end.

Since the space between the header 45 and the upper end of the short guide rib 50 on the injector frame is greater than the length of either of the cup-like members of the spring chamber, it will be clear that these members may be easily inserted in the injector frame when assembling the parts of the pressure or injector device. The spaces between the lower ends of the guide ribs 46 and the tail-piece or transverse bottom member 47 at the bottom of the injector frame are greater than the length of the lower cup-like member of the spring chamber. Said member may therefore be removed from the injector frame after detaching the latter from the cylinder 39. Although the two members of the spring chamber are guided for vertical movement in the injector frame by means of the guide ribs 50 and guide grooves 54, we provide additional guides for the upper member 52 of the spring chamber, and for this purpose we increase the thickness of the walls of said cup-like member at diametrically opposite points, as best shown at 58, Figs. 4 and 7. In each of these thickened portions of the upper cup-like member, pin-holes 59 are formed. These pin-holes are reduced in diameter at their lower ends, as at 60, to form upwardly-facing shoulders therein, and in these pin-holes combined guide-pins and pressure or spring-indicators 61 are located, said pins or indicators having reduced intermediate portions 62 providing downwardly-facing shoulders adapted under certain conditions to engage the upwardly-facing shoulders in the pin-holes. The shoulders serve as stops and limit the separating movement of the two members of the spring chamber, as will be hereinafter more particularly described. These pins are further reduced in diameter at their lower ends and threaded, as at 63, and these threaded lower ends are threaded into openings 64 formed in thickened portions 65 of the peripheral wall of the lower cup-like member of the spring chamber.

It will be apparent from the foregoing that the flask forms the base for the apparatus and all parts associated therewith are carried thereby. In this manner a very compact and highly efficient device is provided in which the injector parts can be easily attached and as readily detached from the flask proper.

In the normal or operating relationship of parts these pins project above the upper end of the inverted upper cup-like member of the spring chamber, and the degree of extension of these pins indicates the degree of pressure exerted by the spring within said spring chamber. The pins may be graduated at their upper ends, if desired.

In the use of this invention a preformed waxed-up cast, designated by the numeral 66, is invested as low as possible in the lower section of the flask so that a line across the first molar region of the case will be directly below the axis of the piston or plunger 41, the crests of the ridges 67 of this case being somewhat above the upper edge of the confining wall of this flask section. This waxed-up cast, which is of the usual form, is surrounded by plaster, which becomes bonded thereto and to said wall, and this surrounding plaster 68 is smoothened at the top and preferably inclined downwardly from the upper edge of the lower section, as shown in Figs. 10 to 17. After thus investing the case in the lower section of the flask, a roll of wax about three-sixteenths of an inch in diameter is arched across the case and luted in place just below the first molar teeth to form an arched sprue 69 extending across the denture from right to left; the upper surface of this arched wax-sprue being preferably slightly flattened with its crest or highest elevation in line or approximately in line with the occlusal surfaces of the teeth 70, but not above such level.

Figure 12:
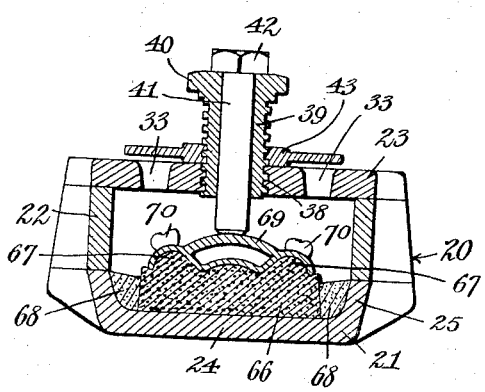
Fig. 12 is a vertical section through the mold or flask showing the manner of adjusting the pressure plunger or piston with respect to the sprue.
Figure 13:
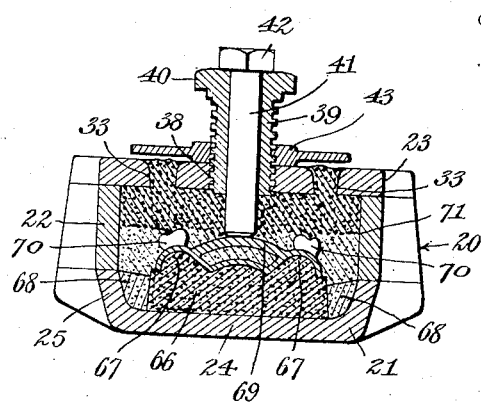
Fig. 13 is a view similar to Fig. 12, illustrating a step in the process of preparing the device for reception of the methyl-methacrylate or other plastic substance employed for forming the denture.
Figure 14:
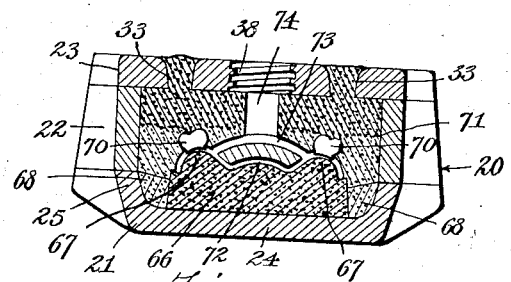
Fig. 14 is a vertical section through the flask after detaching the pressure-cylinder and its plunger or piston, and after boiling out the wax of the case.
Figure 15:
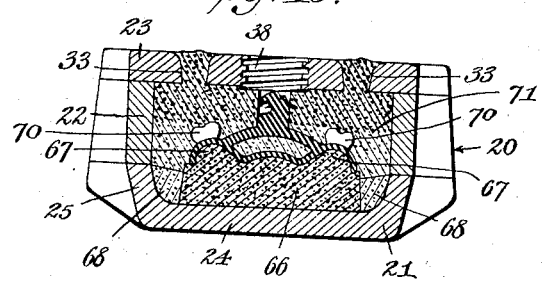
Fig. 15 is a similar view showing the mold or flask partly filled with the denture material.

In thick or heavy cases, an additional wax-sprue may be employed so as to extend to the anterior portion of the denture, one end being luted to the center of the arched wax-sprue, which may be called the molar sprue, and the other end to the surface of the anterior region of the denture. Additional sprues may be provided as desired or required. After thus investing the case and sprueing the same, the central or intermediate section of the flask, with the investment-releasing screw 29 tightened, is placed over the lower section and the cover or upper section placed upon the intermediate section. The cylinder 39 and piston or plunger 41 are then adjusted with a view of positioning the latter so that its lower end touches the wax-sprue 69 and the head 42 or the piston or plunger contacts the upper end of the cylinder 39, as shown in Fig. 12. The cylinder is then locked in adjusted position by tightening the wing lock-nut 43 against the flask cover, making certain that the head of the piston and the upper end of the cylinder remain in contact. After having thus adjusted the cylinder and its piston or plunger, the cover with the cylinder and plunger may be removed and the remaining portion of the flask filled with plaster as usual, but preferably with a view of facilitating later separation of the finished case from the investment, two separate mixes are used as follows: Plaster of Paris is poured into the flask to or approximately to the level indicated at 71, Figs. 13 to 17, leaving the occlusal surfaces of the teeth 70 and the top of the arched wax-sprue uncovered, the crest of the wax-sprue having the plaster of Paris wiped away to expose the same. The flask is then completely filled with artificial stone, or some other suitable investing substance, after which the cover or upper section carrying the cylinder and piston as an assembly is placed upon the previously assembled portion of the flask so that full contact at all points is assured between the upper edge of the intermediate section and the under side of the cover or top section. When thus applying the cover or top section, the surplus investment material, such as the artificial stone referred to, finds escape through the key openings 33, the excess investment material forced through said key openings being wiped flush or substantially flush with the upper surface of the cover or top section. This cover or top section is held firmly in place, and by means of a finger, the piston or plunger is gently tapped so that its head rests against the upper end of the cylinder, as shown in Fig. 13. The investment is then thoroughly hardened, after which the piston, the cylinder, and the wing lock-nut are removed. The wax is then boiled out and the mold cleaned in the customary manner. When the wax is boiled out, the mold will appear as shown in Fig. 14, forming a cavity or cavities 72 and an arched passage or passages 73 where the wax-sprue or sprues previously appeared. This passage or passages open into a vertical opening 74 previously formed around the lower end of the piston or plunger 41 when building up the investment portion within the central or intermediate section of the flask. The vertical opening 74 is co-axial with the internally-threaded opening 38 in the cover or top section of the flask.

It is of course to be understood that the cavity or cavities 72 extend through the area previously occupied by the wax constituting the roof and gum portions of the case, and after the wax is thus boiled out, the teeth 70 now retained only by the investment, have their root or neck portions extending into the cavity or cavities, with space between them and the crests of the ridges 67 extending upwardly from the stone-composition or body portion of the case. The flask is thus prepared to receive the denture material.

It is also to be understood that the tinfoil commonly used in the practice of making dentures (not shown nor previously referred to herein), is next trimmed at the ends of the passage or passages 73 to provide connection between the cavity or cavities 72 which may truly be termed the mold, and the vertical opening 74 which may be termed a reservoir. The mold is then slightly hand packed with denture material. Cellophane which has been wetted and then dried in a towel, is placed between the central or intermediate section of the flask and the lower section, and the flask closed in a bench press to expel all excess material. The flask is again opened and after removing the Cellophane (a step in the process of making dentures commonly employed), more denture material is added if and where required. Any excess material which has been forced out of the cavity or cavities, more definitely referred to as the mold and the passage or passages 73, depending on whether one or more sprues had been employed, which will have been forced out of the mold on or beyond the shoulders of the case, will be removed so that the flask will be completely closed without effort. Under such conditions some plastic denture material will have entered the passage or passages 73 and probably the vertical opening or reservoir 74, which latter with the bore of the sleeve 39 may be termed a feed passage.

Figure 16:
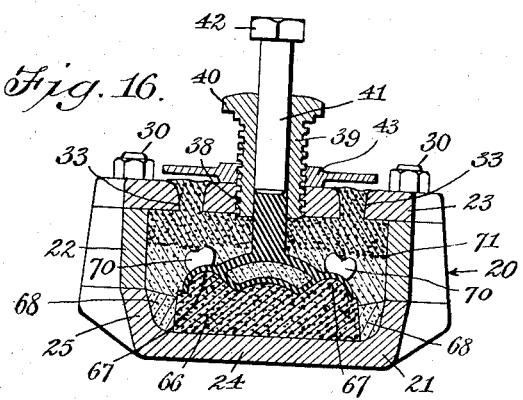
Fig. 16 is a similar view showing additional denture material supplied to the mold or flask ready to be compressed by the piston or plunger under hand pressure.
Figure 17:
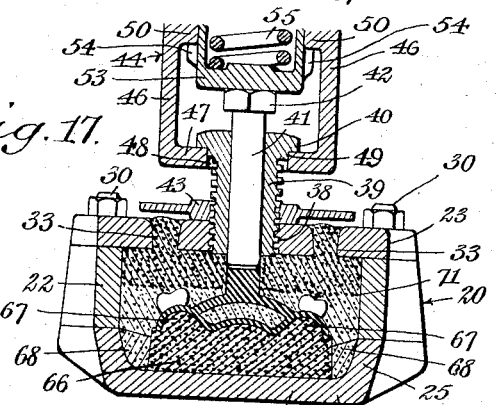
Fig. 17 is a view similar to Fig. 16 with the injector or pressure element of the device attached to the plunger-cylinder.

The flask is then bolted together as shown in Fig. 16, and the cylinder is again threaded into the threaded opening 38 in the cover or top section of the flask until it assumes its original position which is controlled by the hardened investment, the cylinder being locked securely by the wing lock-nut 43. The cylinder and any void existing in the vertical opening or reservoir 74 is next filled with sufficient denture material to cause the piston, when inserted into the cylinder and pressed down by hand, to extend upwardly about one inch above the cylinder, as illustrated in Fig. 16.

With the piston thus arranged in the cylinder, the pressure device or injector is attached to the upper end of the cylinder in the manner previously described. The pressure screw 56 is then tightened until the cup-like members of the spring chamber 51 are spaced a definite distance apart, say for example 2 mm. This causes the piston to be forced downwardly in the cylinder, and in some instances into the reservoir 74 of the investment; and for the sake of clearness we prefer to consider the interior of the cylinder and the vertical opening 74 in the investment as a complete reservoir for the reception of the plastic denture material. The piston will be pressed into this reservoir so considered, and the spring within the spring chamber will hold the piston under sustained pressure during curing.

It is to be noted that when the pressure screw is threaded downwardly in the injector frame and the pressure spring is thereby further compressed within the spring chamber, the pins or indicators 61 will extend upwardly above the upper end of the upper inverted cup-like member of said spring chamber, and the degree of extension will definitely determine the degree of pressure under which the spring is placed. Should the pressure thus exerted result in forcing the piston down so that the head of the same comes close to the upper end of the cylinder, say for example one-eighth of an inch, the spring pressure is released, the piston removed from its cylinder, and more denture material added to the reservoir, after which pressure is again applied in the manner stated. The flask is then allowed to stand a few minutes, and if the spring chambers have become separated, the pressure screw is again tightened until the 2 mm. space or approximately so, is re-established between the two cup-like members of the spring chamber.

The flask with the injector or pressure device attached is next placed in a pan of water so that the lower one-third of the flask is immersed. This retards the curing of the material contained in the reservoir. The curing is effected in the manner prescribed for the particular denture material used.

The spring pressure is, of course, relied upon for properly filling the mold with denture material and causing the same to be properly condensed. Thus, constant pressure is automatically applied to the denture material within the mold and the operator is free to attend to other work. Should he, however, upon examination of the device after having devoted his time to other work, find the indicator pins to be flush with the top surface of the upper member of the spring chamber, he will realize that spring pressure on the denture material is entirely eliminated.

During curing, the indicator pins should at all times show above the upper end of the inverted cup-like member of the spring chamber, and if necessary, the pressure screw is to be tightened until these indicators extend at least one-quarter of an inch.

After curing the case, or in other words, after vulcanizing the denture material, it is allowed to cool and the injector is then detached from the flask by loosening or unthreading the pressure screw. The piston and cylinder are then removed from the flask. They may be removed by aid of the wing lock nut 43 which, when screwed against the shoulder formed by the enlarged portion of the cylinder directly above its threaded region, will serve as a handle, or the injector may be employed to serve as a handle in removing the cylinder and piston from the flask by threading the wing lock nut 43 against the tail piece or transverse bottom member 47 of the injector frame.

A suitable tool is then placed in the prying-notch 32 at the dividing line between the bottom and central or intermediate sections of the flask to lift the case from the bottom section. The cover or top section is then removed in the same manner by inserting a suitable tool in the prying-notch 31. This leaves the case entirely attached to the middle or intermediate section, which is then expanded by loosening the investment-releasing screw 29 sufficiently to permit the easy removal of the finished case therefrom.

The denture is then removed from the investment and cleaned. The sprue formed on the denture by reason of filling the sprue passage 73 with denture material is carefully cut off and the case polished in the usual manner. Clear palate cases and partial dentures are formed in the flask under methods accepted by the profession and need not herein be described since this will be quite clear to those skilled in the art after the description given with reference to the making of a full denture.

Having thus described our invention, what we claim is:

1. In a molding apparatus of the character described, a flask having a mold formed therein provided with a cavity conforming to the article to be molded, a cylinder adjustably threaded into one of the walls of said flask and having a material reservoir connecting the same with said cavity, said cavity adapted to receive material to be molded and said reservoir to receive a quantity of such material, a piston movable within said cylinder and limited in its inward movement by the adjustment made for said cylinder, and an injector device removably applied to said cylinder and having an elongated frame, a pressure screw threaded into said frame, an expansible and contractible spring housing against which said pressure screw acts and a spring within said housing, said spring housing when expanding through the medium of said spring exerting pressure against said piston and said spring being placed under compression by said screw.

2. In a molding apparatus of the character described, a flask having a mold formed therein provided with a cavity conforming to the article to be molded and serving as a base for the apparatus, a cylinder extending from a wall of said flask, said cavity adapted to receive a quantity of material to be molded, a piston movable within said cylinder, an injector frame removably secured to said cylinder in unchanging relation thereto and having a spring-pressure device slidable therein comprising two opposed cup-shaped members and a spring within said members, one of said cup-shaped members bearing against said piston, and a pressure screw threaded into said frame and exerting pressure against the other of said cup-shaped members to compress the spring within said members.

3. In a molding apparatus of the character described, a flask having a screw-threaded opening in one of its walls and a mold formed therein provided with a cavity conforming to the article to be molded, a cylinder adjustably threaded into said screw-threaded opening and extending any selected distance outwardly from the wall of the flask into which it is threaded, the interior of said cylinder being in conduit-connection with said cavity and forming with said connection a material reservoir, said cavity adapted to receive material to be molded and said reservoir to receive a quantity of such material for supplying any deficiency of material that may exist in the cavity, a piston inserted in said cylinder from its outer end and adapted to bear against the material in said reservoir, an injector device removably applied to said cylinder in unchanging relation thereto and comprising an elongated loop-like frame, a pressure-screw threaded through the outer end of said frame, and a spring-pressure device in said frame interposed between said pressure-screw and said piston, said pressure screw placing said spring-pressure device under tension and incidentally applying initial pressure to said piston to force material from said reservoir into said cavity and said spring-pressure device exerting continued pressure on said piston under pressure exerted by said pressure screw to maintain the material within said reservoir and said cavity under constant pressure.

4. In a molding apparatus of the character described, a flask having a screw-threaded opening in one of its walls and a mold formed therein provided with a cavity conforming to the denture to be molded, a cylinder adjustably threaded into said screw-threaded opening and extending any predetermined distance outwardly from the wall of the flask into which it is threaded, said cylinder having an enlargement at its upper end forming a downwardly-facing exterior shoulder thereon, the interior of said cylinder being in conduit-connection with said cavity by a passage serving with said cylinder as a material reservoir, said cavity adapted to receive material to be molded and said reservoir to receive a quantity of such material for supplying any deficiency of material that may exist in the cavity, a piston inserted in said cylinder from its outer end and adapted to bear against the material in said reservoir, an injector device removably applied to said cylinder engaging the underside of the shoulder thereon and comprising an elongated loop-like frame extending outwardly from said cylinder, a pressure-screw threaded through the outer end of said frame, and a spring-pressure device in said frame guided for longitudinal movement therein, said spring-pressure device comprising two opposed cup-like members forming a spring chamber and a helical spring within said members, one of said cup-like members being engaged by said pressure screw and the other being in contact with said piston, said pressure-screw placing said spring-pressure device under tension and incidentally applying initial pressure to said piston through said spring-pressure device to force material from said reservoir into said cavity and said spring-pressure device exerting continued pressure on said piston to maintain material within said reservoir and said cavity under constant pressure.

5. An injector device for flasks for molding dentures, comprising a loop-like frame having spaced-apart side members and adapted to be attached to a flask having an injector piston extending therefrom, a pressure-screw threaded through one end of said frame, and a spring-pressure device comprising two cup-like members having their open ends in opposition to form a spring chamber, and a spring within said chamber bearing at opposite ends against the end walls of said cup-like members, said cup-like members and said side members having co-acting guide elements to guide said cup-like members along said frame, and prevent turning of said members, one of said cup-like members being moved along said guide elements by said pressure-screw and the other of said cup-like members being adapted for contact with said piston.

6. In a molding apparatus of the character described, a flask having a mold formed therein provided with a cavity conforming to the denture to be molded and a passage leading outwardly from said cavity, a piston slidable in said passage, an injector-device in association with said flask comprising a frame having two spaced-apart cup-like members therein arranged with their open ends in opposition to form a spring chamber exerting pressure against said piston, means for guiding said cup-like members for movement in said frame and for preventing rotative movement thereof, a spring within said spring chamber, hand-pressure means for compressing said spring within its chamber against the resistance offered by said piston while moving said cup-like members into closer proximity to each other, one of said cup-like members having pins projecting from its open end at diametrically-opposite points and the other having pin holes extending therethrough to receive said pins, said pins being adapted to project from the outer end of said last-mentioned member when said spring is under compression to indicate the approximate compression of the same.

WALTER J. PRYOR.
EDMOND J. FRANWICK.